(No Model.)

F. A. PAUL.
POTATO DIGGER.

No. 298,022. Patented May 6, 1884.

WITNESSES

INVENTOR

Attorneys

UNITED STATES PATENT OFFICE.

FRANK A. PAUL, OF SOUTH WALES, NEW YORK.

POTATO-DIGGER.

SPECIFICATION forming part of Letters Patent No. 298,022, dated May 6, 1884.

Application filed January 10, 1884. (No model.)

*To all whom it may concern:*

Be it known that I, FRANK A. PAUL, a citizen of the United States, residing at South Wales, in the county of Erie and State of New York, have invented a new and useful Improvement in Potato-Diggers, of which the following is a specification, reference being had to the accompanying drawings.

My invention relates to potato diggers, and it has for its object to provide a device of this character which shall be cheap, simple, and durable in its construction and effective in its operation.

The invention consists in the improved construction and combinations of parts hereinafter fully described, and pointed out in the claim.

Figure 1:
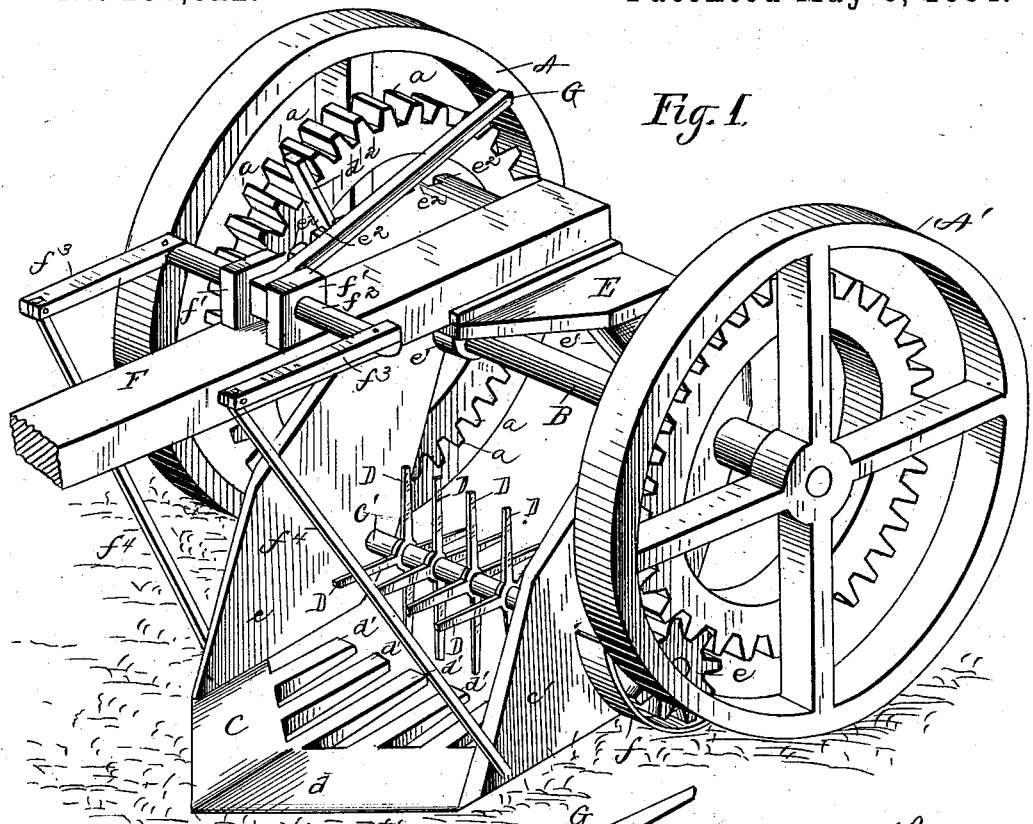
Figure 2:
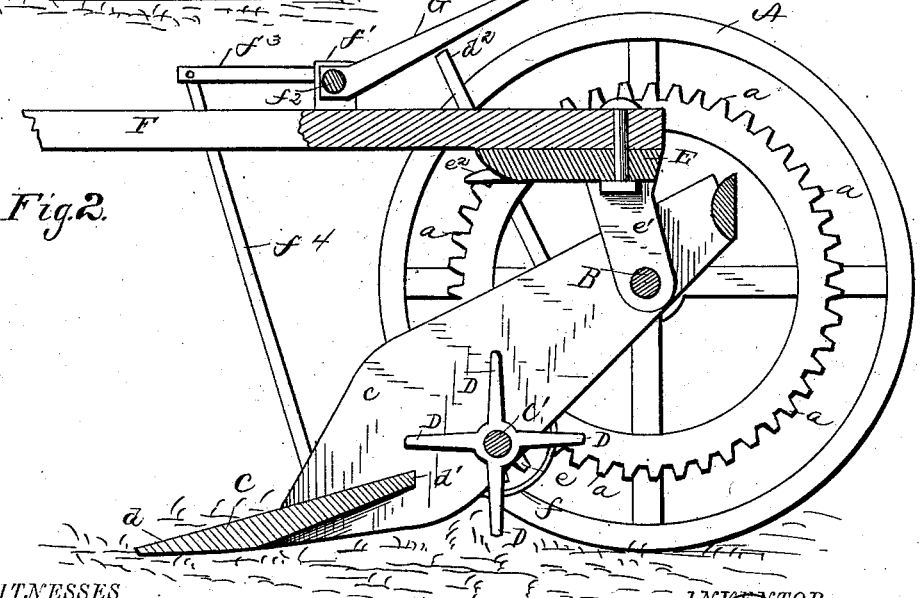

In the drawings, Figure 1 is a perspective view of a potato-digger constructed in accordance with my invention, and Fig. 2 is a vertical longitudinal section of the same.

A A' represent carrying-wheels, which are loosely mounted upon a suitable axle, B, and are provided on their inner sides with a circumferential series of teeth, $a$.

C represents the scoop or plow-frame, the same consisting of the sides $c$ and $c'$ and the plow portion $d$, having the rearwardly-extending arms $d'$. This scoop or frame is loosely mounted upon the axle B, and is provided upon one of its sides with a hand-lever, $d^2$. The said scoop or plow-frame C is also provided, near its lower end, with a shaft, C', journaled in the sides of the said frame, and carrying gear-wheels $e$ at its ends, the said gear-wheels engaging with the teeth or cogs upon the carrying-wheels A A', whereby said shaft or axle C' is revolved. Upon this shaft C' are arranged a series of radially-projecting arms or fingers, D. Upon the side of the plow-frame, and directly underneath the gear-wheels, are arranged wings or guards $f$, the office of which is to protect the gear-wheels from the sand and dirt that would naturally come in contact with the said wheels, owing to their close proximity to the ground when in operation.

E represents a platform, which is provided with downwardly-projecting arms $e'$, which are loosely mounted upon the axle B. This platform E is provided on one of its sides with teeth $e^2$, adapted to engage with the lever $d^2$ when it is desired to raise the scoop or plow from the ground.

F represents a draft-tongue, the rear end of which is secured to the platform E, the forward end of the same being provided with suitable whiffletrees. Upon the draft-tongue F, a short distance in front of the operator's platform, are secured brackets $f'$, in which is mounted a shaft, $f^2$, carrying at its end arms or levers $f^3$, which project at right angles to said shaft, and are connected to rods $f^4$, secured at their lower ends to the front end of the plow or scoop C.

G represents the handle for operating the shaft and levers, the same being secured upon said shaft between the brackets $f'$.

The operation is as follows: Upon the scoop being lowered to the ground and the team started, the said scoop will dig the potatoes, the rearwardly-projecting arms serving as sifters to separate the dirt from the same, and the radially-projecting arms serving to throw the weeds and rubbish from the machine. The scoop may be raised from the ground by the lever G, and retained in a raised position by means of the lever $d^2$ engaging the teeth $e^2$.

Having fully described my invention, what I claim as new, and desire to secure by Letters Patent, is—

In a potato-digger, the combination, with carrying-wheels mounted upon a suitable axle, and provided on their inner sides with a circumferential series of teeth, of a frame loosely mounted on the axle of said wheels, extending forwardly and terminating in a pointed end, and provided with rearwardly-extending arms, a shaft carrying pinions adapted to mesh with the teeth of the carrying-wheels, and journaled in the sides $c$ $c'$, said shaft being also provided with arms or fingers D, guards $f$, arranged below the pinions, and a suitable lever for raising and lowering said frame, substantially as set forth.

In testimony that I claim the foregoing as my own I have hereto affixed my signature in the presence of two witnesses.

FRANK A. PAUL.

Witnesses:
C. A. WIBIRT,
S. H. CORNWELL.